June 19, 1923.  1,459,063
F. KRUSE
SAUSAGE LINKING AND TWISTING DEVICE
Filed June 22, 1921  4 Sheets-Sheet 1

Ferdinand Kruse
INVENTOR.

BY
Richard Geier
ATTORNEYS

June 19, 1923.
F. KRUSE
1,459,063
SAUSAGE LINKING AND TWISTING DEVICE
Filed June 22, 1921     4 Sheets-Sheet 2
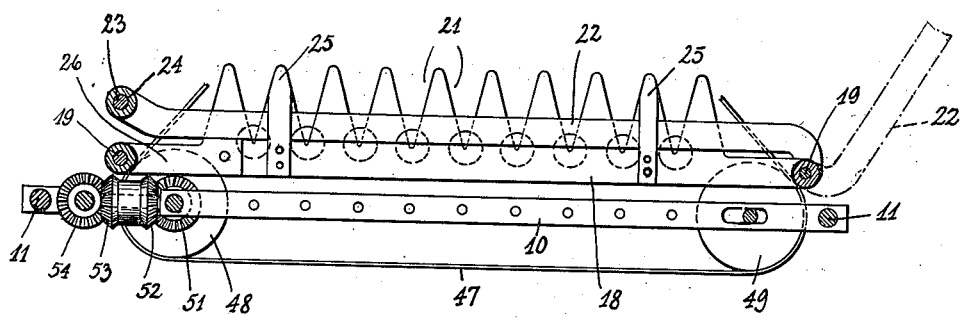
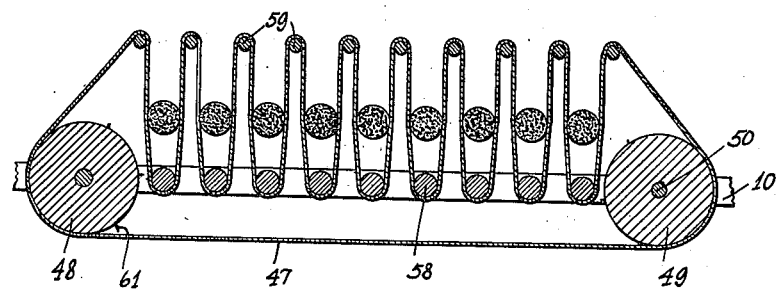
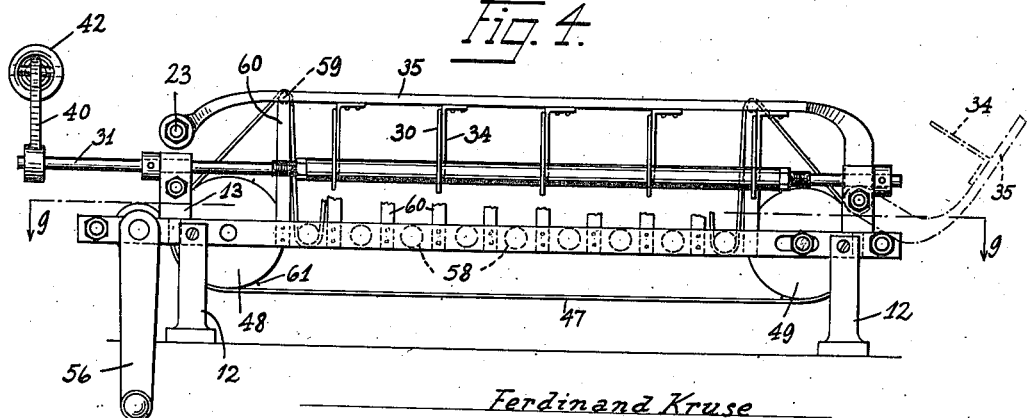
Ferdinand Kruse
INVENTOR.
BY
ATTORNEYS.

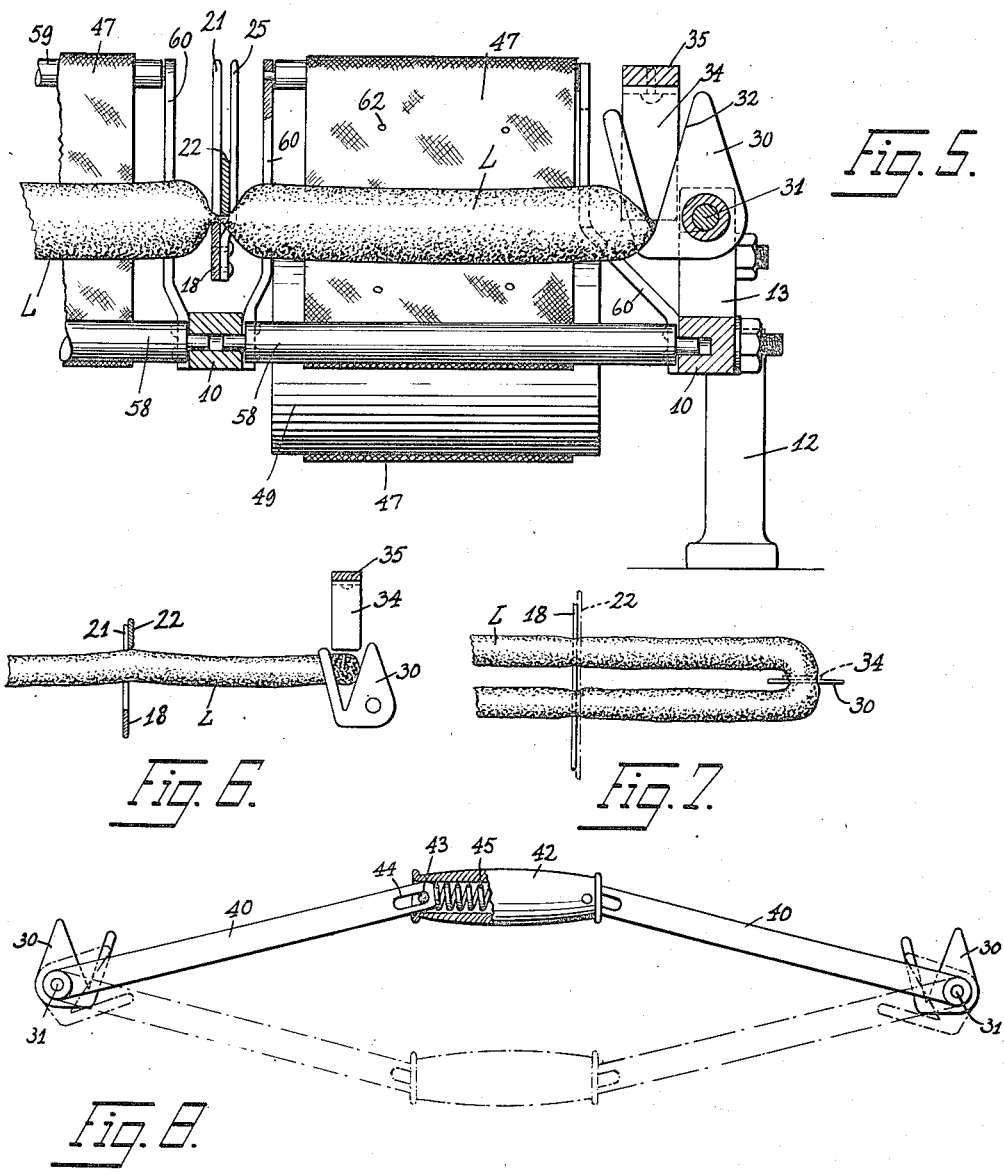

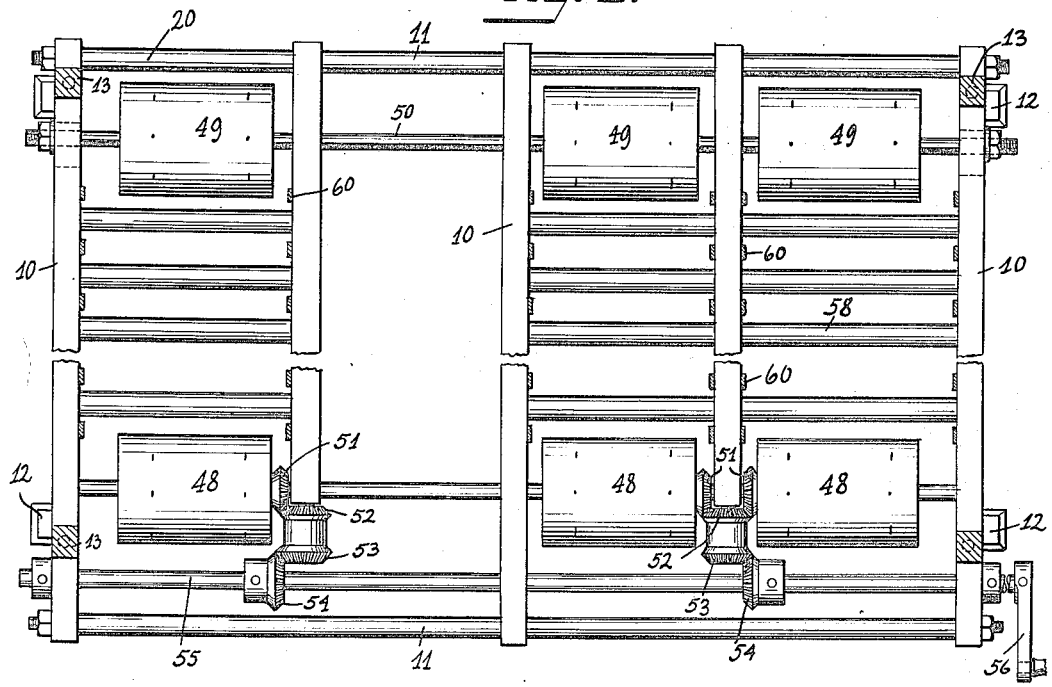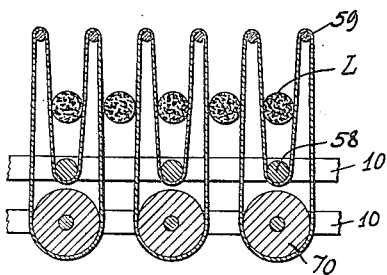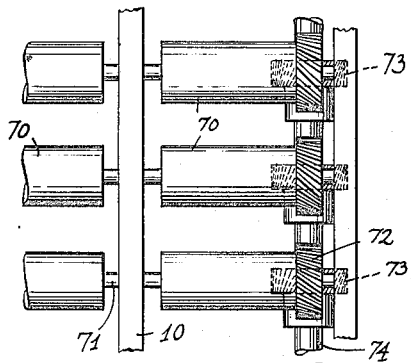

Patented June 19, 1923.

1,459,063

UNITED STATES PATENT OFFICE.

FERDINAND KRUSE, OF PORT RICHMOND, NEW YORK.

SAUSAGE LINKING AND TWISTING DEVICE.

Application filed June 22, 1921. Serial No. 479,461.

*To all whom it may concern:*

Be it known that I, FERDINAND KRUSE, a citizen of the United States, and resident of Port Richmond, Staten Island, in the county of Richmond and State of New York, have invented certain new and useful Improvements in Sausage Linking and Twisting Devices, of which the following is a specification.

This invention relates generally to the manufacture of sausages, having more particular reference to a machine for forming the individual lengths or links of sausages, the present invention being an improvement over a previous one on which I have filed application for Letters Patent under Ser. No. 461879.

The present invention has for its object to provide an improved arrangement of the forming devices which will allow of the completed string of sausages being readily removed from the machine in a compact arrangement best adapted for placing in the usual smoke houses.

Other objects relate more specifically to the arrangement of the twisting means, and to the provision of adjustable end formers to facilitate removal of the string of sausages.

For further comprehension of the invention, and of the objects and advantages thereof, reference will be had to the following description and accompanying drawings, and to the appended claims in which the various novel features of the invention are more particularly set forth.

Fig. 1 of the drawings is a plan view of a sausage forming machine constructed according to the invention, showing the upper forming members thrown back.

Fig. 2 is a transverse sectional view thereof, this being taken on the line 2—2 of Fig. 1.

Fig. 3 is a detail transverse section showing the twisting means, this view being taken along the line 3—3 of Fig. 1.

Fig. 4 is an end view of the machine.

Fig. 5 is an enlarged fragmentary longitudinal section taken along the line 5—5 of Fig. 1.

Fig. 6 is a diagrammatic section on the same line as Fig. 5 but showing the upper formers just about to engage and pinch the sausage.

Fig. 7 is a plan view of the parts as shown in Fig. 6.

Fig. 8 is a detail side view of the means for adjusting the lower end formers for removal of the completed string of sausages.

Fig. 9 is a horizontal sectional view of the machine taken along the line 9—9 of Fig. 4.

Fig. 10 is a similar view to Fig. 3 but showing a modified arrangement of the twisting means.

Fig. 11 is a plan view showing the main rollers of this modification, and the means for driving same.

Fig. 12 is a detail sectional perspective view of the stick used in hanging the sausages in the smoke house.

Fig. 13 is an elevation of the stick with the sausages suspended therefrom.

Figure 1:
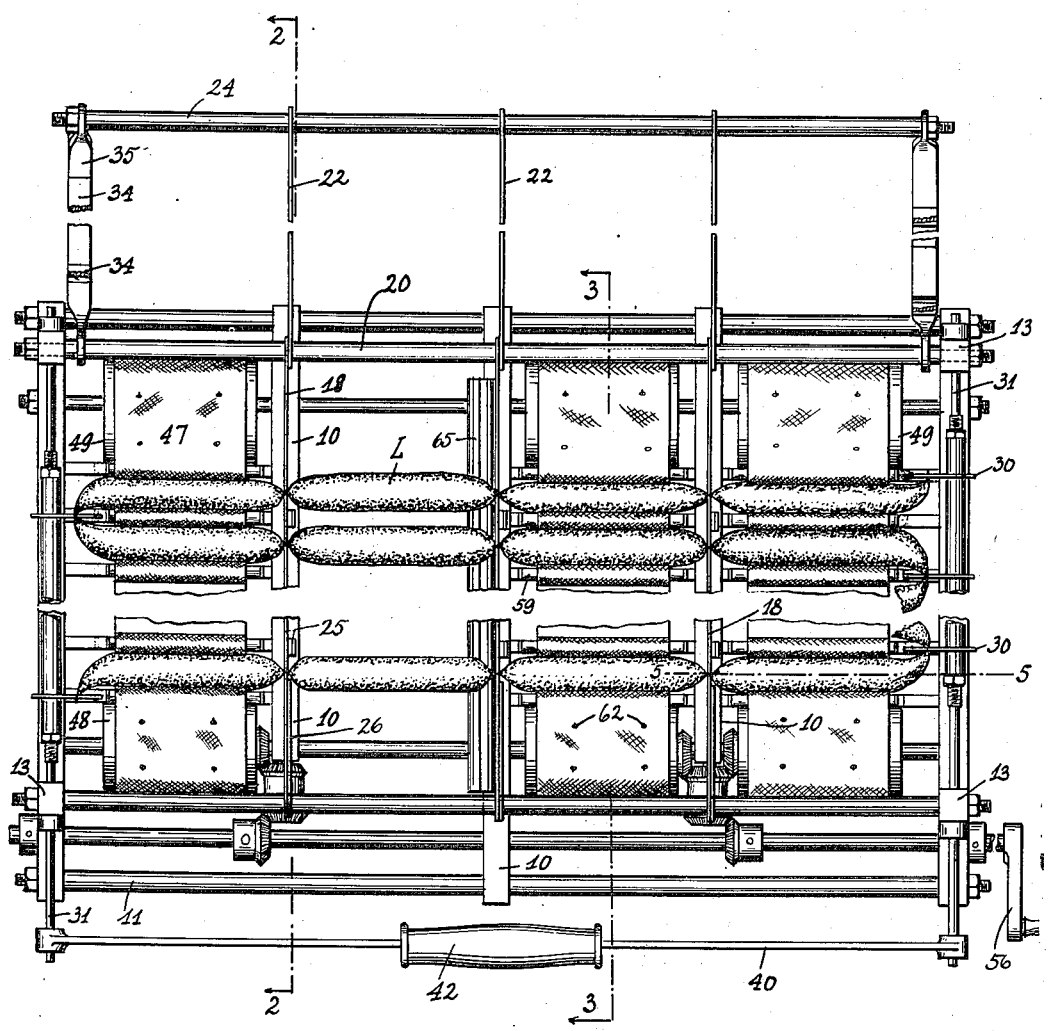

In the machine as here shown a series of lower, or stationary, and upper, or movable, former elements are provided and are so arranged that the stuffed casing may be threaded back and forth in a continuous length over the stationary former elements, this particular arrangement of the formers constituting the main features of difference between the present machine and the one disclosed in my previous application above referred to, although there are various additional specific features of novelty in the present machine.

Referring now to the drawings, the machine as here embodied comprises a frame consisting of the transverse bars 10 united by the longitudinal rods 11, this frame being here shown as supported on legs 12 secured at their upper ends to the transverse bars 10. Extending upwardly from opposite ends of the bars 10 are short standards 13 which serve to support the lower former elements.

These lower former elements comprise the transverse blades 18 which are spaced apart the proper distance and are mounted at their ends in longitudinal rods 19 extending between and fixed to the standards 13. The blades 18 have suitable apertures formed therein through which the rods 19 pass freely, the blades being localized on the rods by means of spacer sleeves 20 interposed therebetween. For pinching the sausages the blades 18 are formed to present V-shaped recesses 21 in their upper edges.

The upper former elements comprise the blades 22 which are pivotally attached at one end to the rods 19 adjacent the fixed blades 18. The opposite ends of these blades 22 are connected rigidly together by means of a rod 23 passing freely therethrough and having spacing sleeves 24 placed thereon between the blades. To insure of close contact between the blades 22 and 18 the latter have fixed thereto the spaced fingers 25, between which and the blades 18 the blades 22 engage as clearly shown in Fig. 5. The downward movement of the blades 22 may be limited by straps 26.

As previously stated, the stuffed casing is threaded back and forth over the former elements provision being made for the pinching of the casing at the points where it is reversed. For this purpose a series of lower former elements are arranged at each end of the machine, being staggered transversely of the machine with respect to the V shaped recess or notches 21. These former elements are supported by the standards 13 and comprise plates 30 fixed at one corner to rock shafts 31 suitably journaled in these standards, these plates having V-notches 32 of similar shape to the notches 21, cut therein. Co-operating with these former plates 30 are upper former members comprising flat fingers 34 which are fixed to arms 35 pivoted on the rod 19 at one end and fixed to the rod 23 at their opposite ends similarly to the blades 22, these arms moving in unison with the blades 22 as will be apparent. When the upper formers are swung downward the fingers 34 pass downward adjacent the plate 30 and in registry with the slots 32 therein.

The plates 30 are adapted to be swung to the position shown in dot and dash lines in Fig. 8 to facilitate withdrawal of the necks of the sausage from the notches 32, and for this purpose I have shown a pair of arms 40 fixed to the ends of the shafts 31 and extending toward one another. These arms 40 project, at their adjacent ends, into opposite ends of a sleeve handle 42 being connected to the latter by means of pins 43 fixed in the handle and passing through slots 44 in the ends of the arms. A coiled expansion spring 45 is located in the sleeve 42 and bears against the ends of the arms 40, this spring acting to hold the plates 30, in either position, and being of sufficient strength to resist the downward pressure of the fingers 34.

The individual lengths or links of sausage are also preferably given a relative twisting movement by the machine. To this end a series of belts 47 are provided and are passed over suitable guide elements to be caused to engage the sausages on opposite sides thereof. The supporting and guiding means for each of these belts comprises a pair of main rollers 48 and 49 arranged on opposite sides of the machine, these rollers being rotatably mounted on rods 50 extending longitudinally of the machine and supported by the frame bars 10. Fixed co-axially to the rollers 48 are bevel gears 51 meshing with like gears 52 loose on pintles on the ends of certain of the intermediate frame bars 10 which are shortened for this purpose. These latter gears 52 have fixed thereto other bevel gears 53 meshing with like gears 54 on a shaft 55 suitably journaled in the frame bars 10 and having a crank handle 56, on one end for rotation. Suitably journaled in the frame bars 10, between the rollers 48 and 49 is a series of smaller rollers 58, while a second series of small rollers 59 is arranged above, and in staggered relation to these rollers, the rollers 59 being supported by arms 60 projecting up from the frame bars 10. The belts 47 are led in vertical reaches between these upper and lower rollers and engage the sausage on opposite sides thereof. The drive rollers 48 have pins 61 fixed in peripheries and engaging in holes 62 in the belts to prevent slipping of the latter.

In forming the sausages, the stuffed casing is laid in the notches 21, 32, being threaded back and forth as shown in Fig. 1, the machine being here shown as arranged to divide each reach into four links, this arrangement being preferable for hanging the sausages in the smoke house, although I do not limit myself thereto. Likewise the number of reaches which can be accommodated transversely of the machine can be varied as desired. The links of sausage are indicated at L in the drawings.

The movable former elements 22 are then swung downwardly, compressing the sausage into the apices of the notches 21, 32 and pinching the same into necks separating individual links. The crank handle 56 is then rotated, driving the belts 47 and causing the adjacent links to be turned or twisted in opposite directions.

For hanging the sausages in the smoke house I preferably employ a stick 65 such as shown in Fig. 12, this stick being inserted transversely of the machine at the centre thereof under the sausages. This stick is provided with a longitudinal groove into which the necks between the two centre rows of links may be pressed by a rod 67 when the sausages are to be removed from the machine.

When releasing the sausages from the machine the former blades 22 are swung back, and the handle 42 depressed to swing the plates 30 inwardly. The sausages are then lifted from the machine by the stick 65, hanging down on opposite sides thereof as shown in Fig. 13, and transferred to the smoke house. The present arrangement, it will be noted, allows of the formation of a large number of sausages from a single unbroken casing.

In Figs. 10 and 11 I have shown a modified arrangement of the drive belts in which a series of drive rollers 70 are arranged under the small rollers 58, being fixed on shafts 71 supported in the frame bars 10 and driven by spiral gears 72 on the ends thereof engaged by like gears 73 on a countershaft 74.

Having thus described my invention what I claim as new and desire to protect by Letters Patent of the United States is as follows:

1. In a sausage linking and twisting machine, a plurality of endless twisting belts, intermediate former elements arranged between said belts, and end former elements arranged transversely to said intermediate former elements.

2. In a sausage twisting machine, a plurality of endless twisting belts intermediate former elements each having a plurality of V shaped recesses therein arranged between said twisting belts and end former elements arranged transversely of said intermediate former elements and in staggered relation to said V shaped notches.

3. In a sausage forming machine a series of former elements adapted to have a single length of sausage threaded back and forth in opposite directions thereover, certain of said former elements being adapted to engage and contract the sausage directly at the points where the latter is reversed.

4. In a sausage forming machine, end and intermediate former elements, the end elements being arranged transversely to the intermediate elements.

5. In a sausage linking and twisting machine, a plurality of endless belts arranged to form a plurality of spaced vertical reaches between which the sausage casings are adapted to be received and intermediate former elements mounted between said belts, said former element being provided with a plurality of V shaped recesses in alignment with the spaces between said vertical reaches.

6. In a sausage forming machine, a series of former elements adapted to have a single length of sausage threaded back and forth in opposite directions thereover, and traveling belts adapted to engage the sausage on opposite sides thereof, said belts presenting vertical reaches between which the sausage extends.

7. In a sausage forming machine, end and intermediate former elements presenting V-shaped notches, the end elements being arranged transversely to the intermediate elements, and means for rocking said end elements to incline the notches therein toward the intermediate elements.

8. In a sausage forming machine, a frame, a pair of rods in said frame, former blades supported at their ends on said rods, and spacer sleeves on said rods between said blades.

9. In a sausage forming machine, end and intermediate former elements presenting V-shaped notches, the end elements comprising plates arranged transversely to the intermediate elements, rock shafts on which said plates are fixed, arms fixed to said rock shafts and extending toward one another, a sleeve handle with which the adjacent ends of the said arms slidably engage, and a spring in said handle bearing on the ends of said arms.

10. In a sausage forming machine, end and intermediate former elements, the end elements being arranged transversely to the intermediate elements, and belts presenting vertical reaches adapted to engage the sausage on opposite sides thereof.

11. In a sausage forming machine, a plurality of parallel endless belts arranged to form substantially vertical reaches, former elements arranged between said belts, and means for driving the alternate belts in opposite directions.

12. In a sausage forming machine, a plurality of endless belts arranged to form a plurality of substantially vertical reaches, said reaches spaced apart whereby a sausage casing is adapted to be received between said reaches, and means for driving the opposed reaches in opposite directions.

13. In a sausage forming machine, a plurality of endless belts arranged to form a plurality of substantially vertical reaches, said reaches spaced apart whereby a sausage casing is adapted to be received between said reaches, means for driving the opposed reaches in opposite directions and former elements between said belts.

14. In a sausage forming machine, a plurality of endless belts, means for driving said belts in opposite directions, intermediate former elements arranged between said belts, end former elements arranged transversely to said intermediate former elements.

15. In a sausage forming machine, a frame, a plurality of former elements mounted at spaced intervals upon said frame, a plurality of endless belts mounted in each of the spaces between said former elements except in one of the spaces adjacent the central part of the machine which space is left free to provide a space for a smoke stick, said belts arranged to form a plurality of spaced vertical reaches and means to drive adjacent belts in opposite directions.

Signed at New York in the county of New York and State of New York this 10th day of June A. D. 1921.

FERDINAND KRUSE.